(12) United States Patent
Herrmann et al.

(10) Patent No.: US 11,528,386 B1
(45) Date of Patent: Dec. 13, 2022

(54) PRINTING COLOR SEPARATION AND FIDUCIALS ON SUBSTRATES IN AN INKJET PRINTER TO REGISTER AND PRINT REMANING COLOR SEPARATIONS

(71) Applicant: Xerox Corporation, Norwalk, CT (US)

(72) Inventors: Douglas K. Herrmann, Webster, NY (US); Seemit Praharaj, Webster, NY (US); Chu-Heng Liu, Penfield, NY (US); Jason M. LeFevre, Penfield, NY (US); Varun Sambhy, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/460,866

(22) Filed: Aug. 30, 2021

(51) Int. Cl.
*H04N 1/58* (2006.01)
*H04N 1/00* (2006.01)
*H04N 1/60* (2006.01)
*H04N 1/034* (2006.01)

(52) U.S. Cl.
CPC ............ *H04N 1/58* (2013.01); *H04N 1/0066* (2013.01); *H04N 1/00793* (2013.01); *H04N 1/034* (2013.01); *H04N 1/603* (2013.01); *H04N 1/6097* (2013.01)

(58) Field of Classification Search
CPC ............ H04N 1/00023; H04N 1/0066; H04N 1/00785; H04N 1/00793; H04N 1/034; H04N 1/50; H04N 1/504; H04N 1/506; H04N 1/508; H04N 1/56; H04N 1/58; H04N 1/60; H04N 1/603; H04N 1/6097
See application file for complete search history.

(56) References Cited

U.S. PATENT DOCUMENTS

| | | | | |
|---|---|---|---|---|
| 4,017,891 A | * | 4/1977 | Helmberger | G03G 15/0142 386/326 |
| 4,829,326 A | * | 5/1989 | Emmett | G06T 3/0012 347/116 |
| 6,300,968 B1 | * | 10/2001 | Kerxhalli | G03G 15/0152 347/116 |
| 6,526,240 B1 | * | 2/2003 | Thomas | H04N 1/00031 399/72 |
| 6,682,163 B2 | * | 1/2004 | Metzler | H04N 1/00002 347/116 |
| 8,005,378 B2 | | 8/2011 | Sheflin et al. | |
| 8,045,218 B2 | * | 10/2011 | Qiao | H04N 1/407 358/3.26 |
| 8,126,359 B2 | * | 2/2012 | Calamita | G03G 15/0152 399/116 |
| 8,376,503 B1 | | 2/2013 | Wu et al. | |
| 8,649,052 B2 | * | 2/2014 | Hoover | G03G 15/5062 358/1.14 |
| 8,753,026 B2 | * | 6/2014 | Haan | B41J 2/01 347/14 |
| 9,044,960 B2 | | 6/2015 | Mizes et al. | |

(Continued)

*Primary Examiner* — Scott A Rogers
(74) *Attorney, Agent, or Firm* — Maginot Moore & Beck LLP (57) ABSTRACT

A method of operating a printer separates the image data content of a sheet in a print job into multiple color separations. The first color separation printed on the sheet includes at least two fiducials printed in the least perceptible color of ink in the printer. The at least two fiducials are used to identify the process direction and skew of the printed sheet before the remaining color separations are printed on the sheet with the first color separation.

22 Claims, 4 Drawing Sheets

(56) References Cited

U.S. PATENT DOCUMENTS

| | | |
|---|---|---|
| 2002/0012018 A1 | 1/2002 | Ohtsuka et al. |
| 2003/0092796 A1 | 5/2003 | Tsao et al. |
| 2004/0021732 A1 | 2/2004 | Bergen |
| 2008/0143776 A1 | 6/2008 | Konno et al. |
| 2008/0292368 A1 | 11/2008 | Baretsky et al. |
| 2009/0086231 A1 | 4/2009 | Marumoto |
| 2010/0245446 A1 | 9/2010 | Nishikori et al. |
| 2011/0080615 A1 | 4/2011 | Ono et al. |
| 2011/0181897 A1 | 7/2011 | Noguchi et al. |
| 2013/0084439 A1 | 4/2013 | Ojiro et al. |
| 2015/0055184 A1* | 2/2015 | Lin .................. B41J 2/2146 358/3.06 |
| 2015/0138268 A1 | 5/2015 | Chen et al. |

* cited by examiner

PRINTING COLOR SEPARATION AND FIDUCIALS ON SUBSTRATES IN AN INKJET PRINTER TO REGISTER AND PRINT REMAINING COLOR SEPARATIONS

TECHNICAL FIELD

This disclosure relates generally to devices that produce ink images on media, and more particularly, to the image quality of the images produced by such devices.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving member and form an ink image that corresponds to the digital image content used to generate the firing signals. The image receiving member can be a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent printheads in the cross-process direction to double the pixels per inch density of a line of the color of ink ejected by the printheads in the two assemblies. As used in this document, the term "process direction" means the direction of movement of the image receiving members as they pass the printheads in the printer and the term "cross-process direction" means a direction that is perpendicular to the process direction in the plane of the image receiving members.

High quality prints increasingly use coated substrates for brochures, magazine covers, and the like. These coated substrates, especially when moved at high speeds past the printheads, produce challenges for the quality of color ink images because the different colored inks overlay one another and are not readily absorbed by the coated substrates. Consequently, they spread over the surface of the coated substrates before the substrates enter a dryer that removes water and solvents from the ink to fix the image to the coated substrates. These unabsorbed inks produce an image defect known as overlay graininess. Developing inkjet color printers that enable ink images on coated substrates to be produced with little or no overlay graininess would be beneficial.

SUMMARY

An inkjet printer is configured to produce color images on coated substrates with little or no overlay graininess. The color inkjet printer includes a plurality of printheads, a media transport configured to move media sheets past the plurality of printheads, an image sensor configured to generate image data of the media sheets before the media sheets pass the plurality of printheads, and a controller operatively connected to the image sensor and the media transport. The controller is configured to receive image data content for a sheet in a print job, generate at least two color separations using the image data content for the sheet, add image content data corresponding to at least two fiducials to a first color separation to be printed of the at least two color separations, print the first color separation and the added image data content on the sheet, and use image data of the printed first color separation on the sheet generated by the image sensor to register and print remaining color separations of the at least two color separations on the sheet.

A method of operating a color inkjet printer produces color images on coated substrates with little or no overlay graininess. The method includes receiving with a controller image data content for a sheet in a print job, generating at least two color separations using the image data content for the sheet, add image content data corresponding to at least two fiducials to a first color separation to be printed of the at least two color separations, printing the first color separation and the added image data content on the sheet, and using image data of the printed first color separation to register and print remaining color separations of the at least two color separations on the sheet.

BRIEF DESCRIPTION OF THE DRAWINGS

The foregoing aspects and other features of a color inkjet printer and color inkjet printer operational method that produces color images on coated substrates with little or no overlay graininess are explained in the following description, taken in connection with the accompanying drawings.

DETAILED DESCRIPTION

For a general understanding of the environment for the printer and printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

Figure 1:
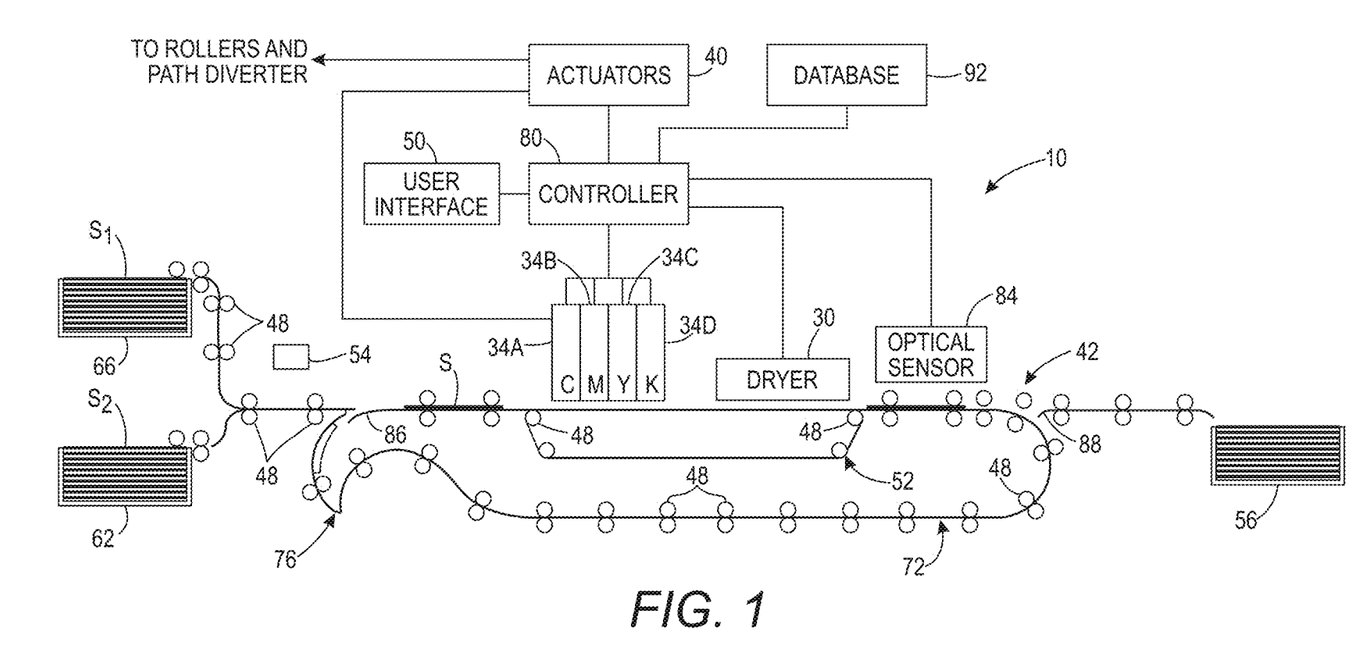
FIG. 1 is a schematic drawing of a color inkjet printer that produces color images on coated substrates with little or no overlay graininess.

FIG. 1 depicts a high-speed color inkjet printer 10 in which a controller 80 has been configured to perform the process 400 described below to produce color images on coated substrates with little or no overlay graininess. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise the media transport 42. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Before the sheets pass by the printheads in the printhead modules 34A, 34B, 34C, and 34D, they pass opposite an image sensor 54. Image sensor 54 is configured to detect pixels of a predetermined color in a color image on the sheets passing by the image sensor 54. The image sensor 54 is operatively connected to the controller 80 to provide signals indicating detection of pixels in a cross-process direction row of the color ink image and the positions of the detected pixels. As explained more fully below, the controller 80 is configured with programmed instructions stored in a memory operatively connected to the controller that cause the controller, when executed, to determine the position of the leading edge of a sheet entering the print zone of the printer and to register a next color image to be printed over the color image currently on the sheet. The image sensor 54 can be implemented as two sensors positioned at predetermined positions corresponding to fiducial positions on sheets entering the print zone or the image sensor 54 can be implemented as a linear image sensor having a width equal to the image portion of the print zone. The image sensor 54 includes a light source that illuminates a portion of the ink image on a substrate and a receiver that receives the light reflected by the surface of the substrate and the inks on the substrate. Image sensor 54 can be implemented with a digital camera, an array of LEDs and photodetectors, or the like.

Figure 2:
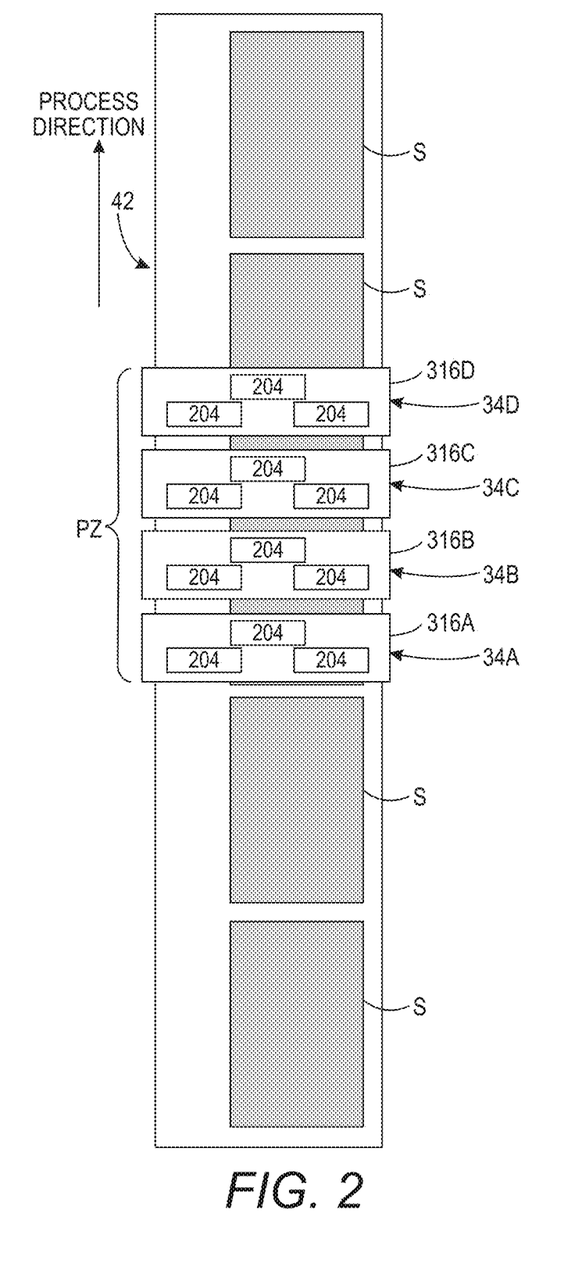
FIG. 2 depicts the print zone in the printer of FIG. 1.

The print zone PZ is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to a printhead carrier plate 316A, 316B, 316C, and 316D, respectively.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport continue moving to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80, which is configured to determine which inkjets, if any, that were operated to eject ink did in fact do so or if they did not eject an ink drop having an appropriate mass or that landed errantly on the sheet. Any inkjet operating in this manner is called an inoperative inkjet in this document. The controller can store data identifying the inoperative inkjets in a memory operatively connected to the controller. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operably connected to the components of the printhead modules 34A-34D (and thus the printheads), the actuators 40, and the dryer 30. The ESS or controller 80, for example, is a self-contained, dedicated mini-computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

Figure 3A:
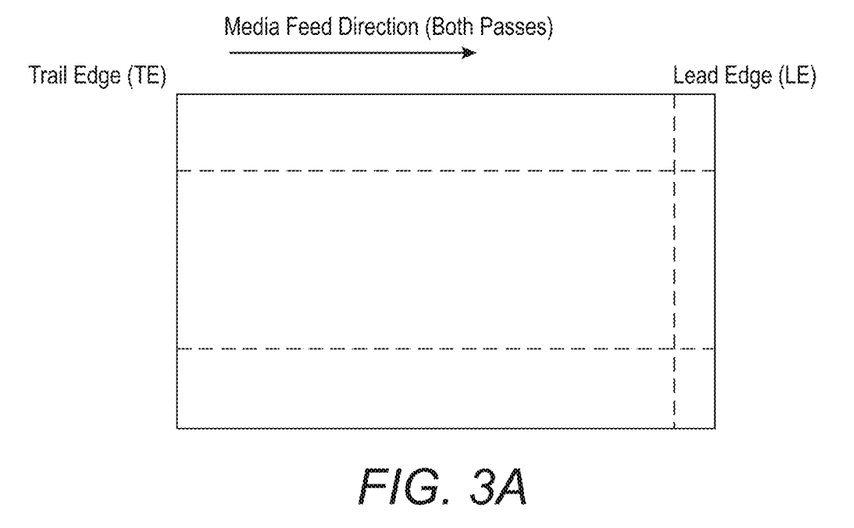
FIG. 3A depicts a printed sheet as viewed by an operator of the printer shown in FIG. 1.

FIG. 3A illustrates a sheet of media that has had a color image printed on it during a previous pass of the media sheet by the printhead modules 34A, 34B, 34C, and 34D. During the previous pass, two of the four modules have been operated to form two color separations of the color image on the sheet. This printed two color separation then passes through the dryer 30 to partially fix the printed two color separation to the sheet. This partial fixation of the two colors to the sheets attenuates the ink bleed that occurs when all four colors are printed onto the sheet before being subjected to drying. The actuators 40 are operated by the controller 80 to divert the sheet bearing the partially fixed two color separations to the duplex path without inverting the sheet before passing the sheet to the media sheet path so the printed image on the sheet can pass the printhead modules 34A, 34B, 34C, and 34D a second time. As used in this document, the term "color separation" means a portion of the ink image formed with less than all of the pixels used to form the complete ink image. A color separation can include all of the colors in the printer or a subset of the colors. In one embodiment, a CMYK printer forms a color separation with the yellow pixels and the pixels formed with at least one other color. In another embodiment, a color separation is formed with a predetermined percentage of all of the pixels used to form the ink image. For example, in one embodiment, fifty percent of all of the pixels, regardless of color, are used to form a first color separation and the remaining pixels are used to form a second color separation. The image content data is divided into two or more color separations so the substrate bears less ink when it enters the dryer than it does when the complete ink image is formed before entering the dryer. This partial image is at least partially fixed to the substrate before the remaining portion of the ink image is formed over the first color separation. This division of the ink image into two or more printings attenuates overlay graininess and improves image quality, especially on coated stocks.

The arrows in FIG. 3A point to the locations where two fiducials were printed during the first printing of the color image. In one embodiment of the printer 10, the fiducials are printed as two pixels of yellow ink because yellow is the most imperceptible color in a CMYK printer to a human observer. Additionally, the fiducials, regardless of color, are printed in the first line of the image area. Because the view presented in FIG. 2A is that of a human operator no fiducials are depicted. As used in this document, the term "fiducial" refers to a single printed feature at a predetermined location on an ink receiving surface. The controller 80 adds image content data to the image content data for a first color separation that corresponds to at least two fiducials to be printed in a single linear arrangement that extends in the cross-process direction across the print zone in the first color separation. The added image content data positions the two fiducials from one another at a predetermined distance sufficient to enable measurement of image skew. As used in this document, the term "skew" means the tilting of the color ink image previously printed on a printed sheet with respect to the process direction of the sheet. A greater distance between fiducials means a more accurate measurement of the image skew. In one embodiment, the distance between the fiducials on a substrate having a width of 8.5 inches is 140 mm or approximately 5.5 inches. Of course, other fiducial separation distances can be used on such a sheet or on other sheets having a different width.

Inkjet printers print ink images on media sheets having a variety of dimensions. For sheets shorter than 11 inches, the sheets are fed into the print zone with the long edge of the sheet being the leading edge while 11 inch long sheets or longer are fed into the print zone with the short edge being the leading edge. To accommodate this variety of sheet orientations through the print zone, the image sensors 54 for the fiducials are positioned at a fixed location that comports with the width of the sheets in the print zone regardless of orientation. Thus, the positions of the fiducials on the sheets correspond to the fixed positions of the image sensors. During the return trip to the position at the end of the duplex path, the orientation and position of the sheets are adjusted by operating actuators moving the rollers in the duplex path so the orientations and cross-process position of the sheets are adjusted to mitigate skew and the process and cross-position positions of the sheets before they enter the print zone. The inclusion of the printed fiducials provides additional accuracy of image registration by processing the image data generated by the fiducial sensors 54 to adjust the firing signals for forming the next color separation to register the next color separation to the previously printed color separation.

Figure 3B:
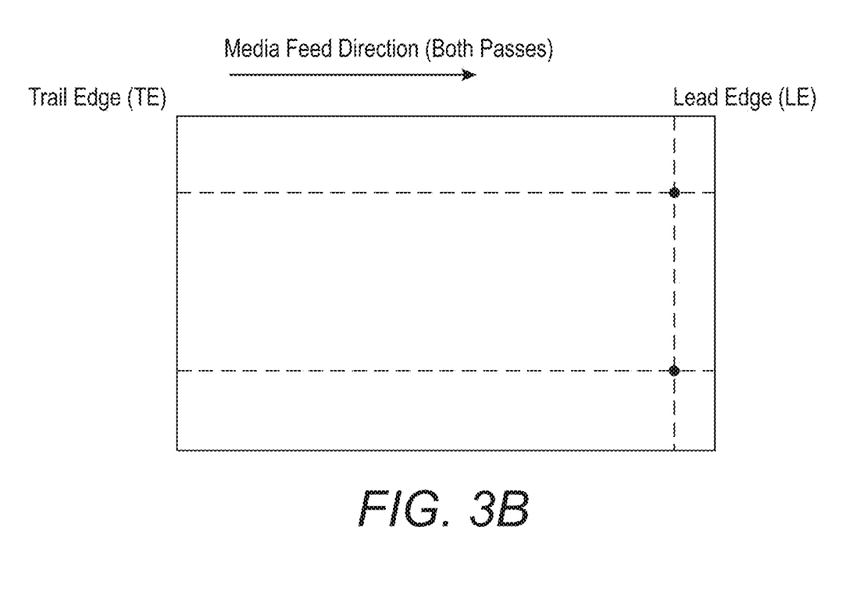
FIG. 3B depicts a printed sheet as imaged by an image sensor in the printer of FIG. 1.

FIG. 3B shows an image of the sheet shown in FIG. 3A produced by the image sensor 54. The image sensor 54 is configured with a light source that is complementary of the color of ink used to produce the fiducials or a filter that is complementary of that ink color so the pixels printed with that ink color are prominent in the image. The first line in the image portion of the sheet is the line that contains the fiducial pixels. The controller 80 analyzes the image data generated by the sensor for the predetermined positions of the printed fiducials to identify the fiducials in the first color separation and determine the skew of the image. The skew measurement is used by the controller 80 to change the orientation of the next color separation to be printed on the sheet so the registration of the second ink image aligns properly with the first color image. With this information, the controller 80 operates the printheads of the printhead assemblies forming the second color image to print the pixels of the next color separation on the sheet bearing the previously printed color separation. Consequently, the fiducials enable more accurate registration of the at least two color separations required to address overlay graininess so image quality is not adversely impacted by the division of the image content data into at least two color separations.

Figure 4:
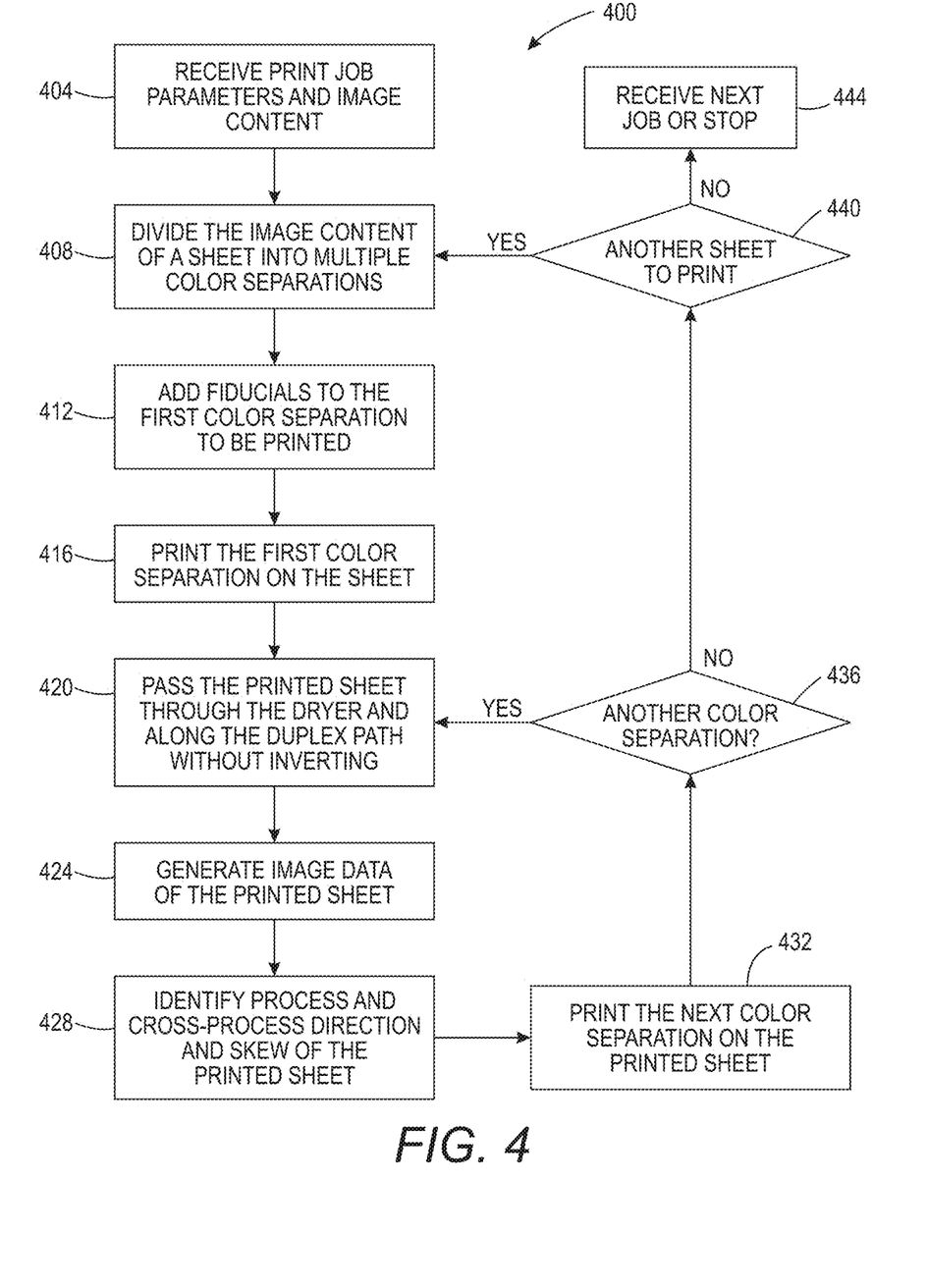
FIG. 4 is a flow diagram of a process for operating the printer of FIG. 1 to register the printing of a second portion of an ink image on an image receiving surface bearing a previously printed portion of the ink image.

FIG. 4 depicts a flow diagram for a process 400 that operates the printer 10 to register the printing of a second color image with a previously printed color image on a media sheet. In the discussion below, a reference to the process 400 performing a function or action refers to the operation of a controller, such as controller 80, to execute stored program instructions to perform the function or action in association with other components in the printer. The process 400 is described as being performed with the printer 10 of FIG. 1 for illustrative purposes.

The process 400 of operating the printer 10 begins with the controller receiving the parameters and the image data content for a print job (block 404). The image data content for each sheet is divided into multiple color separations (block 408) and fiducials formed with one of the colors to be printed in the first color separation are added to the first color separation to be printed (block 412). The process operates the printheads ejecting the colors of ink in the first color separation to print the first color separation with at least two fiducials on the media sheet (block 416). The sheet bearing the first color separation is directed through the dryer and diverted to the duplex path without the sheet being inverted (block 420). As the sheet is returned to the media transport for another pass by the printheads, image sensor 54 generates image data of the leading edge of the sheet that contains image data of the at least two fiducials (block 424). The process determines the positions of the fiducials and the distance between the fiducials to identify the process direction and cross-process position of the sheet and any skew of the sheet (block 428). The process operates the printheads ejecting the colors of ink in the next color separation to overlay the next color separation on the previously printed color separation with accurate image registration (block 432). If another color separation is to be printed (block 436), then the printed sheet is returned to the duplex path (block 420) and image data of the printed sheet is analyzed using the fiducials printed in the first color separation to control printing of the next color separation (blocks 424, 428, and 432). Once all of the color separations are printed, the process determines if another sheet is to be printed (block 440). The process continues until all of the sheets are printed and no further print jobs are to be printed (block 444).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for operating a printer comprising:
receiving with a controller image data content for a sheet in a print job;
generating at least two color separations using the image data content for the sheet;
add image content data corresponding to at least two fiducials to a first color separation to be printed of the at least two color separations;
printing the first color separation and the added image data content on the sheet; and
using image data of the printed first color separation to register and print remaining color separations of the at least two color separations on the sheet.

2. The method of claim 1, the use of the image data of the first color separation further comprising:
generating the image data of the printed first color separation with an image sensor;
identifying the at least two fiducials in the generated image data;
identifying a process position and a skew of the printed first color separation; and
using the identified process position and skew of the printed first color separation to operate printheads and print the remaining color separations of the at least two color separations on the sheet.

3. The method of claim 2 wherein the image content data corresponding to the at least two fiducials corresponds to at least two fiducials printed with a least perceptible color of ink ejected by the printheads in the printer.

4. The method of claim 3 wherein the least perceptible color is yellow.

5. The method of claim 4 wherein the image data content corresponding to the at least two fiducials positions the at least two fiducials in a linear arrangement in a cross-process direction.

6. The method of claim 5 wherein the at least two fiducials are positioned at a predetermined distance from one another.

7. The method of claim 6 wherein the at least two fiducials are printed at positions corresponding to fixed positions of at least two image sensors that generate the image data in the cross-process direction across the sheet.

8. The method of claim 6 wherein the image content data corresponding to the at least two fiducials positions the at least two fiducials in a first line of an image area of the sheet.

9. The method of claim 8 further comprising:
directing a blue light on the sheet before generating the image data of the printed first color separation on the sheet.

10. The method of claim 9 further comprising:
directing through a dryer the sheet on which the first color separation is printed to partially dry ink on the sheet after the first color separation is printed but before the next color separation in the other color separations is printed on the sheet.

11. The method of claim 10 further comprising:
Using the generated image data to operate actuators and adjust an orientation of the sheet on which the first color separation has been printed.

12. An inkjet printer comprising:
a plurality of printheads;
a media transport configured to move media sheets past the plurality of printheads;

an image sensor configured to generate image data of the media sheets before the media sheets pass the plurality of printheads; and a controller operatively connected to the image sensor and the media transport, the controller being configured to receive image data content for a sheet in a print job, generate at least two color separations using the image data content for the sheet, add image content data corresponding to at least two fiducials to a first color separation to be printed of the at least two color separations, print the first color separation and the added image data content on the sheet, and use image data of the printed first color separation on the sheet generated by the image sensor to register and print remaining color separations of the at least two color separations on the sheet.

13. The inkjet printer of claim 12, the controller being further configured to:

identify the at least two fiducials in the generated image data;

identify a process position and a skew of the printed first color separation; and use the identified process position and skew of the printed first color separation to operate printheads and print the remaining color separations of the at least two color separations on the sheet.

14. The inkjet printer of claim 13, the controller being further configured to:

use the image content data corresponding to the at least two fiducials to print the at least two fiducials with a least perceptible color of ink ejected by the printheads in the printer.

15. The inkjet printer of claim 14 wherein the least perceptible color is yellow.

16. The inkjet printer of claim 15, the controller being further configured to:

use the image data content corresponding to the at least two fiducials to position the at least two fiducials in a linear arrangement on the sheet in a cross-process direction.

17. The inkjet printer of claim 16, the controller being further configured to:

use the image data content corresponding to the at least two fiducials to distance the at least two fiducials at a predetermined distance from one another.

18. The inkjet printer of claim 17, the image sensor further comprising:

at least two image sensors positioned at fixed locations in the cross-process direction; and the controller is further configured to add the image data content corresponding to the at least two fiducials at positions corresponding to the fixed locations of the at least two image sensors.

19. The inkjet printer of claim 17, the controller being further configured to:

use the image data content corresponding to the at least two fiducials to position the at least two fiducials in a first line of an image area of the sheet.

20. The inkjet printer of claim 19, the at least two image sensors being further configured to:

direct a blue light on the sheet before generating the image data of the printed first color separation on the sheet.

21. The inkjet printer of claim 20, the controller being further configured to:

direct through a dryer the sheet on which the first color separation is printed to partially dry ink on the sheet after the first color separation is printed but before the next color separation in the other color separations is printed on the sheet.

22. The inkjet printer of claim 21, the controller being further configured to:

use the generated image data to operate actuators and adjust an orientation of the sheet on which the first color separation has been printed.

* * * * *